United States Patent
Tran et al.

(10) Patent No.: US 7,046,308 B1
(45) Date of Patent: May 16, 2006

(54) METHOD AND APPARATUS FOR TRANSMITTING DIGITAL TELEVISION DATA

(75) Inventors: Thanh T. Tran, Houston, TX (US); Michael P. Moriarty, Spring, TX (US); Giang H. Dao, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/191,629

(22) Filed: Nov. 13, 1998

(51) Int. Cl.
*H04N 7/01* (2006.01)
*G06F 13/16* (2006.01)

(52) U.S. Cl. ..................... 348/725; 345/521

(58) Field of Classification Search .............. 348/725, 348/723, 441, 440.1, 456, 445, 571, 384.1, 348/715, 714, 718, 719; 345/530, 545–546, 345/547, 558
See application file for complete search history.

(56) References Cited

U.S. PATENT DOCUMENTS

| | | | |
|---|---|---|---|
| 4,994,912 A * | 2/1991 | Lumelsky et al. .......... 348/441 |
| 5,113,259 A | 5/1992 | Romesburg et al. ........ 358/183 |
| 5,291,275 A * | 3/1994 | Lumelsky .................... 348/441 |
| 5,420,609 A | 5/1995 | Izzi et al. .................... 345/190 |
| 5,426,445 A * | 6/1995 | Prouty et al. ................. 345/28 |
| 5,451,981 A * | 9/1995 | Drako et al. ................ 345/118 |
| 5,534,942 A * | 7/1996 | Beyers, Jr. et al. ......... 348/569 |
| 5,574,836 A * | 11/1996 | Broemmelsiek ............ 395/127 |
| 5,640,332 A * | 6/1997 | Baker et al. ................ 345/559 |
| 5,696,912 A | 12/1997 | Bicevskis et al. ........... 395/308 |
| 5,796,960 A | 8/1998 | Bicevskis et al. ........... 395/286 |
| 5,801,705 A * | 9/1998 | Kato et al. .................. 345/419 |
| 5,812,150 A | 9/1998 | Lum ........................... 345/522 |
| 5,841,418 A * | 11/1998 | Bril et al. .................... 345/596 |
| 5,933,154 A * | 8/1999 | Howard et al. ............. 345/540 |
| 6,002,385 A * | 12/1999 | Silverbrook ................ 345/100 |
| 6,037,981 A * | 3/2000 | Wilson et al. .............. 348/384 |
| 6,067,098 A * | 5/2000 | Dye ........................... 345/521 |
| 6,118,413 A * | 9/2000 | Bril et al. .................... 345/596 |
| 6,122,010 A * | 9/2000 | Emelko ...................... 348/461 |
| 6,201,927 B1 * | 3/2001 | Comer ......................... 386/68 |
| 6,304,297 B1 * | 10/2001 | Swan ......................... 348/556 |
| 6,330,038 B1 * | 12/2001 | Johnson ..................... 348/625 |
| 6,459,426 B1 * | 10/2002 | Eglit et al. .................. 345/213 |

OTHER PUBLICATIONS

Microsoft Corporation, "PC Video Synchronization and Playback", Sep. 3, 1998, pp. 1-5, http://www.microsoft.com/hwdev/desinit/vidsynch.htm.

(Continued)

*Primary Examiner*—Paulos M. Natnael (57) ABSTRACT

A digital television/local bus interface logic supports handling of digital television (DTV) data with non-tearing. The interface logic provides a dual frame buffer DTV architecture in which a pair of DTV/local bus frame buffers alternate functions: one frame buffer stores incoming DTV data and the other frame buffer stores the outgoing DTV data. When a refresh of a display device reaches a programmed position of the display device, the interface logic determines which frame buffer is being updated by the incoming DTV data. The outgoing DTV data is then read from an opposite frame buffer and transmitted to the display device. The interface logic receives a horizontal sync signal and a vertical sync signal from the graphics controller for monitoring refresh of the display device. The interface logic also provides an architecture for transferring decoded DTV data over a local bus to the graphics controller.

38 Claims, 5 Drawing Sheets

OTHER PUBLICATIONS

Intel Corporation, "A Digital Broadcast White Paper", Copyright 1997, pp. 1-3, http://developer.intel.com/drg/news/digbrwh.htm.

Robertson, Jack, Zenith Allies with Intel on PC Digital TV—Venerable consumer electronics company demonstrates a DTV using a 300-MHz Pentium II for a progressive-scan computer screen, Dec. 15, 1997, pp. 1-2, CMP Media Inc., Electronic Buyers' News, Issue: 1088, Section: News, http://www.techweb.com/se/directlink.cgi?EBN19971215S0008.

Yoshida, Junko and Leopold, George. Chip Makers Target Next-Generation Digital TV; Aug. 25, 1997, pp. 1-5, CMP Media Inc., EE Times, TechWeb News, http://www.techweb.com/se/directlink.cgi?WIR1997082511.

webmaster@dtv.org, "Compaq, Microsoft and Intel Announce Initiative To Work With Television Industry to Broaden and Accelerate Digital TV Opportunities", Apr. 7, 1997, pp. 1-4, DTV Home Press Release, http://www.dtv.org/pr01.html.

* cited by examiner

METHOD AND APPARATUS FOR TRANSMITTING DIGITAL TELEVISION DATA

BACKGROUND OF THE INVENTION

1. Field of the Invention

The present invention relates to transfer of progressive scan digital television data (DTV) with non-tearing, and more particularly to a method and apparatus for transferring progressive scan DTV data on a peripheral component interconnect (PCI) bus with non-tearing.

2. Description of the Related Art

The advent of digital television technology has presented significant opportunities for the computer industry. Computer systems are expected by many to join traditional consumer television products as mainstream devices for receiving digital television (DTV) signals. A DTV-enabled computer system will likely include a DTV receiver for receiving DTV data signals.

Conventional computer system video architecture for supporting analog television data has offered certain system limitations for a computer system DTV architecture. Typically, the graphics video port in computer system video architecture has not been a standard port. It has thus been configured to support a number of proprietary port types. Both a non-standard graphics controller port and a video port cable have been required to accommodate analog television data. This has compromised refresh rate speed and analog television data resolution.

A common, recurring problem with analog television data in these situations has been what is known as tearing. It occurred because of different refresh rates between the graphics controller and the incoming data. At times, portions of two separate data frames were displayed rather than a single whole frame. The display image thus appeared torn. Because of this, the problem was known as tearing. So far as is known, it was typical to force the graphics controller refresh rate to match the incoming video refresh rate, a technique known as genlocking. This, however, had problems. Usage of the display screen was less than optimal. Also, there was often an undesirable, noticeable flicker on the display screen.

SUMMARY OF THE INVENTION

Briefly, in accordance with the present invention, a system supports transfer of digital television (DTV) data with non-tearing. A digital television/local bus interface logic of the system provides a dual frame buffer DTV architecture in which a: pair of frame buffers alternate functions: one frame buffer stores incoming DTV data and the other frame buffer stores outgoing DTV data. Incoming DTV data is written to one frame buffer. When a refresh of a display device reaches a programmed position of the display device, the system determines which frame buffer is being updated by incoming DTV data. The outgoing DTV data is then read from an opposite frame buffer and is transmitted to the display device. The dual frame buffer DTV architecture insures that the outgoing DTV data to be delivered to the display device includes a whole frame so as to prevent tearing. Outgoing DTV data is synchronized to a refresh rate of a graphics controller coupled to the interface logic. The interface logic in effect decouples the refresh rate of the incoming DTV data from the refresh rate of the outgoing DTV data. Non-tearing may therefore be accomplished while optimizing the refresh rate of the graphics controller.

The interface logic provides an architecture for transferring DTV data over a local bus. A DTV tuner provides encoded digital television data to a DTV decoder. The DTV decoder decodes the digital television data and passes the decoded digital television data to the digital television/local bus interface logic. At the appropriate time determined by the programmed position, the digital television/local bus interface logic pumps the decoded digital television data over a local bus to the graphics controller. The decoded digital television data is provided to the graphics controller through core logic. From the graphics controller, the decoded digital television data is sent to the display device. The interface logic thus eliminates the need for a video port cable between a graphics controller and a television tuner and the need for a non-standard graphics controller video port.

A disclosed exemplary embodiment of the digital television/local bus interface logic includes a DTV interface for receiving incoming DTV data, a local bus interface for transmitting outgoing DTV data, two frame buffers for storing incoming DTV data and outgoing DTV data in an alternating manner, and a memory controller for storing incoming DTV data to one frame buffer and reading outgoing DTV data from an opposite frame buffer. The interface logic receives a horizontal sync signal and a vertical sync signal from the graphics controller for monitoring refresh of the display device. The local bus is disclosed as being compatible with a peripheral component interconnect (PCI) bus. Further, the interface logic may be configured to accommodate multiple DTV data streams, permitting scalable picture-in-picture (PIP) functionality.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

In order to provide an understanding of the computer system S of the present invention (FIGS. 2–6), a description of a typical prior art video architecture is first given.

Figure 1:
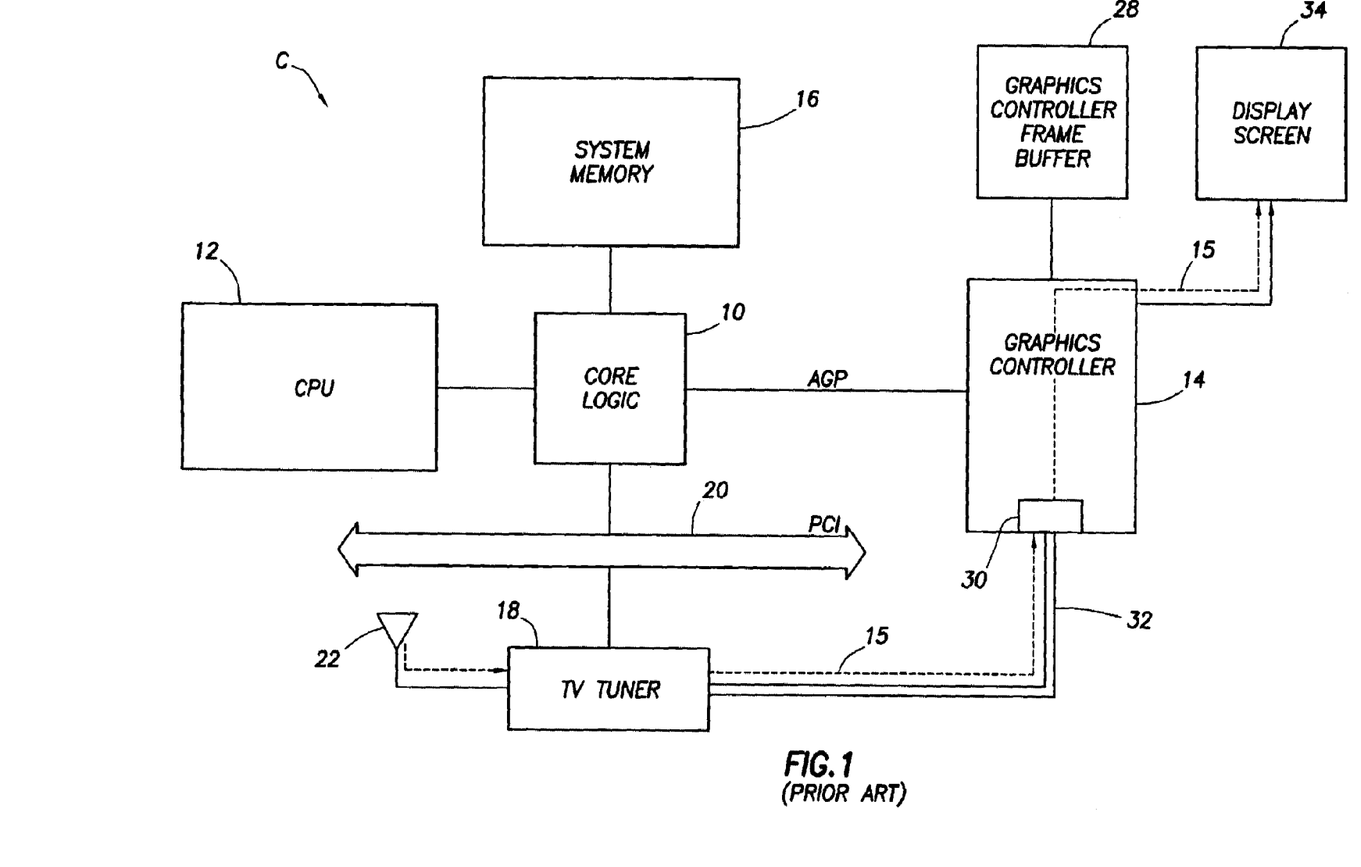
FIG. 1 is a block diagram of a typical prior art video architecture of a conventional multimedia computer system.

Referring to FIG. 1, a typical video architecture of a conventional multimedia computer system C is shown. The computer system C includes a core logic 10 coupled to a central processing unit (CPU) 12, a graphics controller 14 via an accelerated graphics port (AGP), and a system memory 16. A television tuner 18 is coupled to a peripheral component interconnect (PCI) bus 20 and to an antenna 22 for receiving analog television data.

The graphics controller 14 is coupled to a graphics controller frame buffer 28 for storing the analog television data. Analog television data is typically provided from the television tuner 18 to a graphics controller video port 30 of the graphics controller 14 via a video port cable 32. The video port 30 is typically an 8-bit port, and the video port cable 32 typically provides a 26-pin connector. Since the graphics controller video port 30 has not been a standard port, the port 30 has been configured to support multiple proprietary port types. A few examples of proprietary port types include video media interface (VMI), video interface port (VIP) provided by Video Electronics Standards Association (VESA), and AI Media Channel (AMC). Conventional video architecture thus has typically required both a non-standard graphics controller video port and a video port cable to accommodate analog television data. Transfer paths within a conventional video architecture for analog television data other than via the video port cable 32 have typically compromised the speed of the graphics controller refresh rate and/or the resolution of the analog television data.

The single port nature of the graphics controller 14 has also posed an architectural constraint. Since the graphics controller 14 provides a single video port 30, only a single video stream has been provided from the graphics controller 14 to the display screen 34. Certain video features, however, such as scalable picture-in-picture (PIP), the capability of expanding and shrinking multiple windows without loss of video quality, have not been possible with only a single video stream. A typical transfer path of analog television data in video architecture is shown by a dashed arrow line 15.

A common artifact with handling of analog television data by the computer system C, which a computer system DTV architecture must confront, has been tearing. Normally, a current image is shown on a display screen or other display device 34 until a next full image is received. Each image is thus at least an update interval old when it is first displayed. As the display screen 34 is being updated, the graphics controller frame buffer 28 may change in mid-refresh causing an image to appear torn across the display screen 34. This has been a result of different refresh rates between the display screen 34 and the incoming analog television data. The refresh rate of the display screen 34 has typically been adjustable through the graphics controller 14.

Analog television data has typically been refreshed at a rate of 60 hertz, and a display screen 34 has typically been refreshed at a rate of 75 to 85 hertz. When the display screen 34 has been updated at a particular frequency and the incoming analog television data has been refreshed at a lower frequency, then the display screen 34 has updated faster than the incoming analog television data. As a result, portions of two separate frames—one frame portion derived from current analog television data in the graphics controller frame buffer 28 and another frame portion derived from incoming analog television data—were displayed on the display screen 34 instead of one whole frame. Because of the torn appearance of the portions of two separate frames, this problem has commonly been termed "tearing."

A conventional approach to preventing tearing has been to force the refresh rate of the display screen 34 to match the refresh rate of the incoming analog television data or to force the refresh rate of the incoming analog television data at its source to match the refresh rate of the display screen 34. This technique has been commonly known as genlocking. Reducing the refresh rate of the display screen 34 to match the refresh rate of the incoming analog television data has not been an optimal use of the display screen 34. Further, such an adjustment has typically been observable in the form of flicker on the display screen 34.

Figure 2:
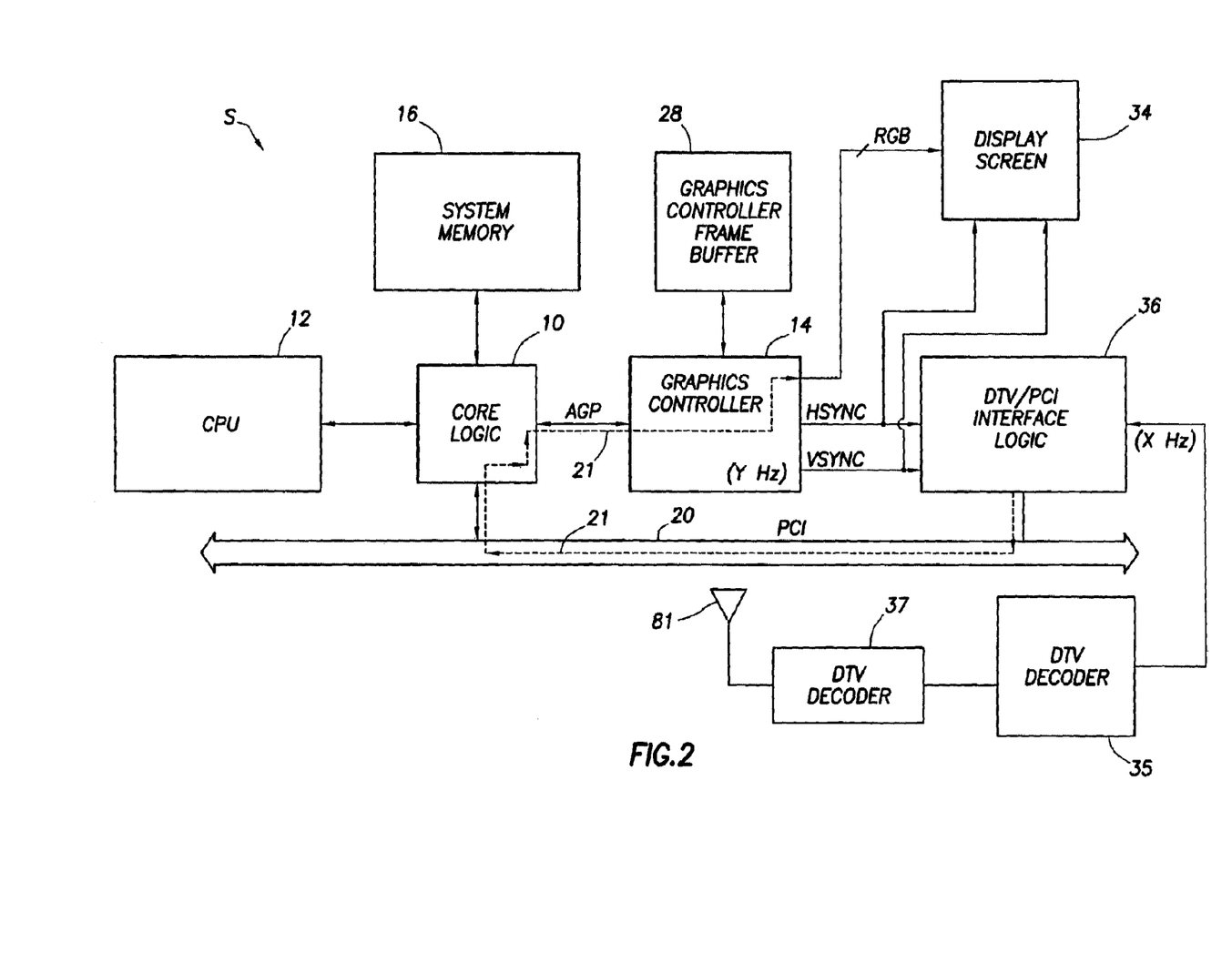
FIG. 2 is a block diagram of a computer system incorporating a digital television (DTV)/peripheral component interconnect (PCI) interface logic and highlighting the flow of outgoing DTV data in accordance with the present invention.

Referring to FIG. 2, a computer system S according to the present invention incorporates a digital television (DTV)/peripheral component interconnect (PCI) interface logic 36. A DTV tuner 37 receives encoded DTV data through an antenna 81 and provides the encoded or compressed DTV data to the DTV decoder 35. The DTV decoder 35 decompresses or decodes the DTV data. The DTV/PCI interface logic 36 receives decoded digital television (DTV) data from the DTV decoder 35. The decoded DTV data is pumped over a PCI bus 20 by the DTV/PCI interface logic 36 to a core logic 10. The core logic 10 may include a system memory controller, an integrated accelerated graphics port (AGP), and the PCI bus 20. An example of a suitable core logic 10 is Intel's 440BX chipset. The core logic 10 passes the DTV data across the AGP to a graphics controller 14. An example of a suitable graphics controller is the ATI 3D RAGE LT PRO manufactured by ATI Technologies, Inc. The graphics controller 14 provides DTV data to and retrieves DTV data from a conventional graphics controller frame buffer 28. From the graphics controller 14, outgoing DTV data may be provided to a display screen or other display device 34. The outgoing DIV data is synchronized to the refresh rate of the graphics controller 14. The graphics controller 14 provides DTV data (i.e., RGB data) to the display screen 34. The transfer path for DTV data from the interface logic 36 through graphics controller 14 is represented by a phantom arrow line 21. The system S eliminates the need for a video port cable and a non-standard graphics controller video port typically used for transfer of analog television data in a conventional computer system. Further, transfer of DTV data in the computer system S is independent of the type of graphics subsystem.

The graphics controller 14 provides a vertical sync signal VSYNC and a horizontal sync signal HSYNC to the display screen 34 and the DTV/PCI interface logic 36. The vertical sync signal VSYNC and the horizontal sync signal HSYNC allow the graphics controller 114 and the DTV/PCI interface logic 36 to monitor refresh of the display screen 34. The vertical sync signal VSYNC indicates the beginning or end of a frame, and the horizontal sync signal HSYNC indicates the beginning or end of a line. By monitoring refresh of the display screen 34, the DTV/PCI interface logic 36 may synchronize transmission of DTV data to the display screen 34 with the refresh rate of the graphics controller 14. One advantage of this form of synchronization is that the refresh rate of the graphics controller 14 (Y Hertz) applied to the outgoing DTV data may differ from the refresh rate of the incoming DTV data (X Hertz). The refresh rate of the graphics controller 14 is normally faster than the refresh rate of the incoming DTV data. The incoming DTV data and outgoing DTV data are matched, regardless of the graphics mode of the computer system S set by a user.

In the past, if television data were sent to a display screen while the display screen was in mid-refresh, the problem known as tearing, as discussed above, occurred. Tearing has been observed in the form of a torn appearance of portions of two separate frames on a display screen. The computer system S avoids the occurrence of tearing by utilizing the vertical sync signal VSYNC and the horizontal sync signal HSYNC as a feedback signal from the display screen 34 to the graphics controller 14. When a programmable position or line of the display screen 34 is refreshed, then the graphics controller 14 provides DTV data to the display screen 34. The programmable position is programmed to a predetermined position or line. The programmed position of the display screen 34 is detected by the graphics controller 14 via the vertical sync signal VSYNC and/or the horizontal sync signal HSYNC. When the programmed position of the display screen 34 is refreshed, the DTV/PCI interface logic 36 has completed its update cycle of incoming DTV data. At such a time, outgoing DTV data may be read and transmitted to the display screen 34 without the occurrence of tearing. The programmed position defines the portion of the refresh of the display screen 34 when incoming DTV data is stored and the portion of the refresh of the display screen 34 when outgoing DTV data is read.

With conventional video architecture, non-tearing has typically been accomplished by forcing the refresh rate of a display screen to match the refresh rate of analog television data. Since a conventional graphics controller has not been configured to monitor refresh of a display screen, conventional video architecture has been an open loop system. While conventional video architecture for supporting analog television data with non-tearing has provided an open loop characteristic, the computer system S provides a closed loop characteristic (i.e., monitoring refresh of a display screen to determine the appropriate time to transmit television data to the display screen) for supporting DTV data with non-tearing.

Since DTV data in its short past has primarily been seen in consumer-based systems, the DTV industry has been unaccustomed to a PCI bus. As noted above, conventional computer systems have typically handled analog television data via a graphics controller video port. In this computer system S, decoded DTV data may be pumped over the PCI bus 20 to the display screen 34 at appropriate times for preventing tearing. In the disclosed exemplary embodiment, the DTV data is progressive scan data providing 54 Mb/s and having a 704×480 progressive scan format.

Figure 3:
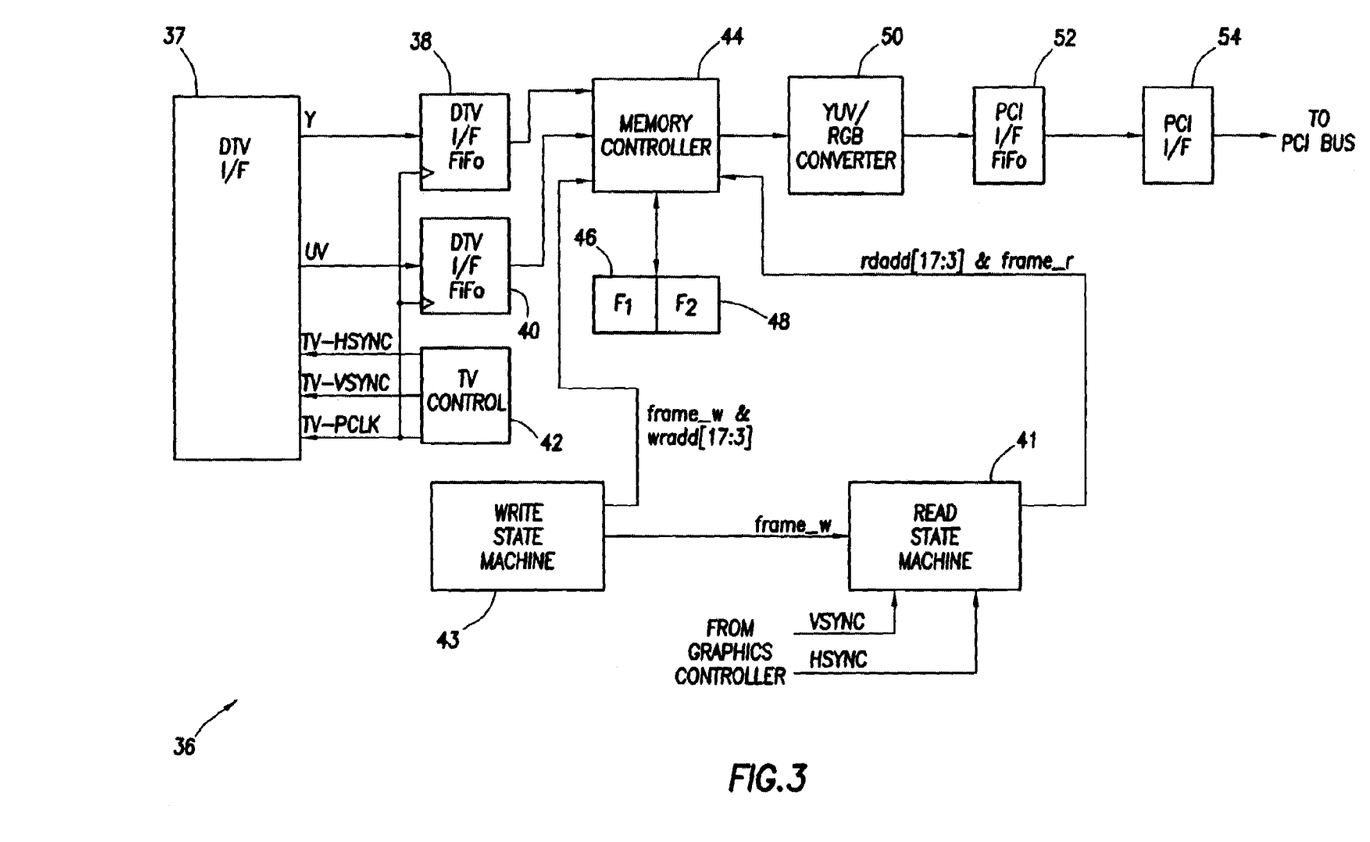
FIG. 3 is a schematic block diagram of an exemplary single DTV data stream embodiment of the DTV/PCI interface logic of FIG. 2 in accordance with the present invention.

Referring to FIG. 3, an exemplary single DTV data stream embodiment of the DTV/PCI interface logic 36 is shown. The interface logic 36 includes a PCI interface 54 for transmitting outgoing DTV data over the PCI bus 20 and a DTV interface 37 for receiving incoming DTV data. The PCI interface 54 acts as a PCI controller. In the disclosed exemplary embodiment, the PCI interface 54 is implemented in hardware description code. It should be understood that alternative implementations are possible.

The interface logic 36 includes DTV interface (I/F) buffers 38 and 40 for holding incoming DTV data and a PCI interface (I/F) buffer 52 for holding outgoing DTV data. In the disclosed embodiment, the PCI interface buffer 52 is a 2K dword deep FIFO. The interface logic 36 also includes a pair of DTV/PCI frame buffers ($F_1$ and $F_2$) 46 and 48 for storing incoming DTV data and outgoing DTV data in an alternating manner. During a portion of the refresh of the display screen 34 prior to its programmed position or point, incoming DTV data is stored to one of the DTV/PCI frame buffers 46 or 48 and outgoing DTV data is read from the opposite DTV/PCI frame buffer 48 or 46.

For the next refresh cycle, during a portion of the refresh of the display screen 34 prior to its programmed position, incoming DTV data is stored to the DTV/PCI frame buffer 48 or 46 which in the previous refresh cycle contained outgoing DTV data. Also, during a portion of the refresh of the display screen 34 prior to its programmed position, the outgoing DTV data is read from the DTV/PCI frame buffer 46 or 48 which in the previous refresh cycle contained incoming DTV data.

Incoming DTV data thus is stored back and forth between frame buffer 46 and frame buffer 48, and outgoing DTV data is read back and forth from frame buffer 46 and frame buffer 48. During a portion of the refresh of the display screen 34 after its programmed position, outgoing DTV data is transmitted from the frame buffer 46 or 48. In particular, data is transmitted from the frame buffer 46 or 48 from which the outgoing DTV data was read from during the portion of the refresh of the display screen 34 prior to its programmed position. In the disclosed embodiment, for each refresh cycle, the outgoing DTV data transmitted to the display screen 34 represents an entire frame.

The interface logic 36 also provides a memory controller 44 for controlling transfer of the incoming DTV data and the outgoing DTV data. On a portion of the refresh of the display screen 34 prior to its programmed position, the memory controller 44 may store incoming DTV data to the $F_1$ frame buffer 46 and read outgoing DTV data from the $F_2$ frame buffer 48. On a portion of the refresh of the display screen 34 after its programmed position, the memory controller 44 may transmit the outgoing DTV data in the $F_2$ frame buffer 48 to the display screen 34. Alternatively, the memory controller 44, during a portion of the refresh of the display screen 34 prior to its programmed position, may store incoming DTV data to the $F_2$ frame buffer 48 and read outgoing DTV data from the $F_1$ frame buffer 46. On a portion of the refresh of the display screen 34 after its programmed position, the memory controller 44 may transmit outgoing DTV data in the $F_1$ frame buffer 46 to the display screen 34.

In the disclosed exemplary embodiment, the memory controller 44 is implemented in hardware description code. It should be understood that alternative implementations are possible. Those skilled in the art should appreciate that the PCI interface 54 and the memory controller 44 might be implemented as state machines. FIGS. 2–5, however, are believed to be the best representation for providing an understanding of operation of a DTV/PCI interface logic in accordance with the present invention.

The DTV/PCI interface logic 36 further includes a read state machine 41 and a write state machine 43. While the state machines 41 and 43 are illustrated as stand alone, it should be understood that alternatively the state machines 41 and 43 might be implemented in the memory controller 44. It is believed that an understanding of the state machines 41 and 43 with respect to the present invention may be gained from the disclosure herein, particularly FIGS. 5 and 6, without reference to state diagrams. The write state machine 43 provides a frame_w signal and a write address WRADD [17:3] to the memory controller 44. The frame_w signal indicates the DTV/PCI buffer to which the DTV interface 32 is writing incoming DTV data. The write address WRADD [17:3] informs the memory controller 44 of the address location within the particular DTV/PCI buffer where DTV data is to be written. The write state machine 43 also provides the frame_w signal to the read state machine 41.

The read state machine 41 defines and provides a frame_r signal to the memory controller 44. The state of the frame_r signal depends upon the state of the frame_w signal. The frame_r signal indicates the frame buffer from which DTV data should be read. The read state machine 41 defines the frame_r signal as an inversion of the frame_w signal. The frame_r signal thus corresponds to the opposite DTV/PCI frame buffer from which the frame_w signal is set. In the disclosed exemplary embodiment, the frame_r signal is updated at the beginning of each frame refresh. The read state machine 41 also provides a read address RDADD[17:3] to the memory controller 44. The read address RDADD [17:3] informs the memory controller 44 of the address location within the particular DTV/PCI buffer from which outgoing DTV data is to be read. The vertical sync signal VSYNC and the horizontal sync signal HSYNC are provided to the read state machine 41.

A particular advantage of this system S is that receipt of incoming DTV data and reading of outgoing DTV data is not overly dependent upon latency of the PCI bus 20. When bus latency prevents the PCI bus 20 from being ready to receive outgoing DTV data, incoming DTV data may still be stored and outgoing DTV data may still be read. The extent to which DTV data may be stored and read depends upon the size of the DTV/PCI frame buffers 46 and 48. By providing separate buffering for incoming DTV data and outgoing DTV data within the DTV/PCI interface logic 36, the system S is less susceptible to latency of the PCI bus 20.

An additional component of the interface logic 36 is a video converter 50. In the disclosed exemplary embodiment, the video converter 50 converts from a YUV video format to an RGB video format. The converter 50 may convert the YUV data to 24-bit or 16-bit RGB data. The Y component of an incoming DTV data stream may be provided to the DTV interface buffer 38, and the UV component of the incoming DTV data stream may be provided to the DTV interface buffer 40. The incoming DTV data stream provided to the DTV interface 37 may also include a television horizontal sync signal TV-HSYNC, a television vertical sync signal TV-VSYNC, and a television clock signal TV-PCLK. These signals may be provided to the DTV interface 37 from a television control unit 42 of the DTV decoder 35. It should be understood that various standard components and signals of a DTV interface may be incorporated into the interface logic 36. This interface logic configuration 36 accommodates a single DTV data stream.

Figure 4:
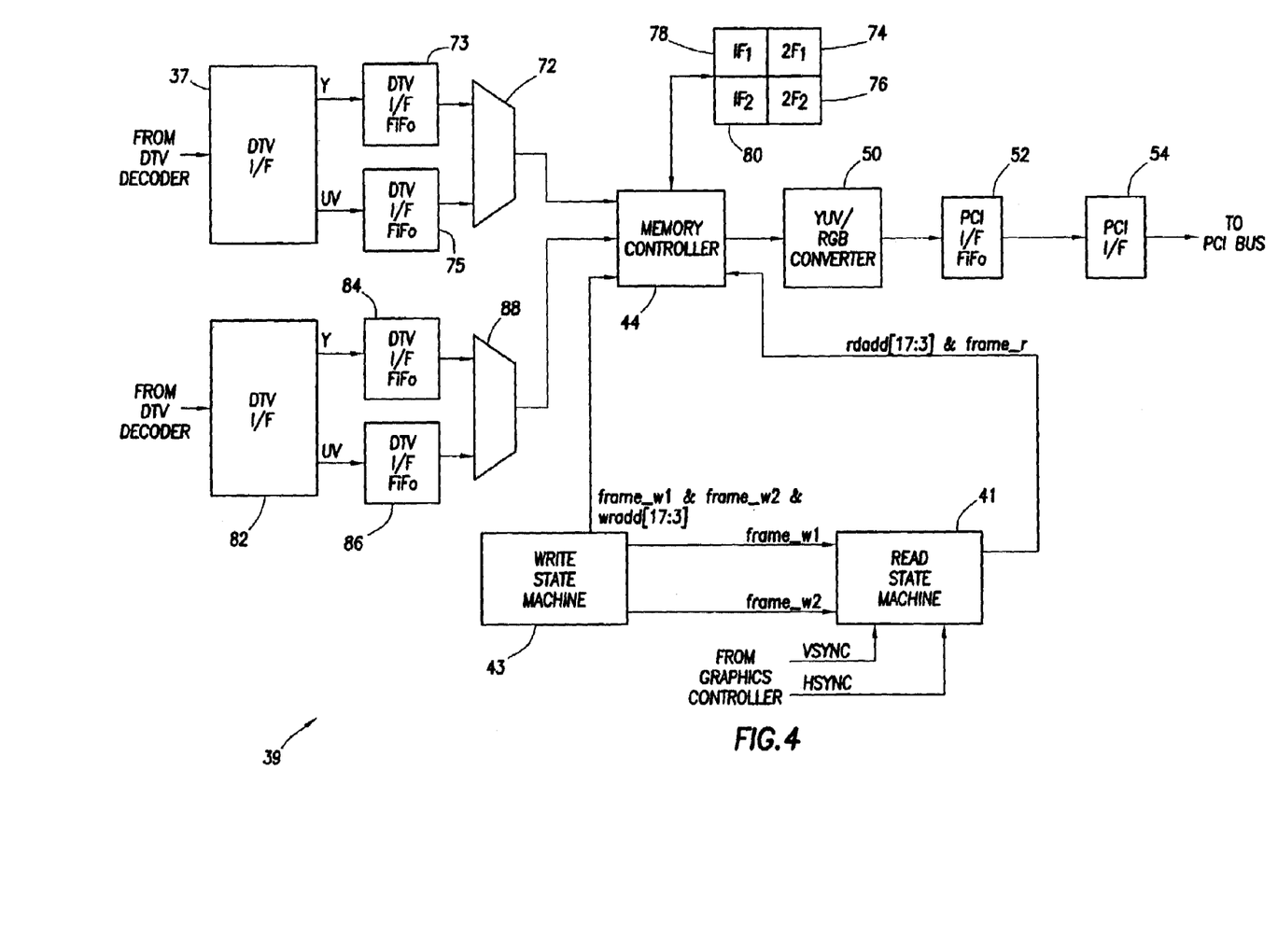
FIG. 4 is a schematic block diagram of an exemplary dual DTV data stream embodiment of the DTV/PCI interface logic of FIG. 2 in accordance with the present invention.

Referring to FIG. 4, an exemplary dual DTV data stream embodiment of the DTV/PCI interface logic 39 is shown. The interface logic 39 is configured to accommodate two simultaneous DTV data streams. Accordingly, the interface logic 39 provides two DTV interfaces 37 and 82. One DTV data stream is provided to the DTV interface 37, and the other DTV data stream is provided to the DTV interface 82. The DTV interface 37 provides a Y component of the particular DTV data stream to a DTV interface buffer 73 and provides a UV component of the particular DTV data stream to a DTV interface buffer 75. The DTV interface 82 provides a Y' component of the particular DTV data stream to a DTV interface buffer 84 and provides a UV' component of the particular DTV data stream to a DTV interface buffer 86. In the disclosed exemplary embodiment, the DTV interface buffers 73, 75, 84, and 86 are implemented as 1K dword deep FIFOs. A DTV multiplexer 72 is coupled to the DTV interface buffer 73 and the DTV interface buffer 75. The multiplexer 72 combines the Y component of one DTV data stream from the DTV interface buffer 73 with the UV component of one DTV data stream from the DTV interface buffer 75. A DTV multiplexer 88 is coupled to the DTV interface buffer 86. The multiplexer 88 combines the Y' component of the other DTV data stream with the UV' component of the other DTV data stream from the DTV interface 82.

The interface logic 39 provides memory in the form of four DTV/PCI frame buffers 74, 76, 78 and 80. In the disclosed exemplary embodiment, each DTV/PCI frame buffer is 169K dwords deep. The $2F_1$ frame buffer 74 and the $2F_2$ frame buffer 76 may store an incoming DTV data stream and an outgoing DTV data stream in an alternating manner. Likewise, the $1F_1$ frame buffer 78 and the $1F_2$ frame buffer 80 may store an incoming DTV data stream and an outgoing DTV data stream in an alternating manner. As noted above, the memory controller 44 controls transfer and storage for incoming and outgoing DTV data streams. While with the interface logic 36 the memory controller 44 is responsible for a single DTV data stream, in this case, the memory controller 44 is responsible for two DTV data streams. For both DTV data streams, the incoming DTV data is decoupled from the outgoing DTV data. The video (YUV/RGB) converter 50, the write state machine 43, the read state machine 41, the PCI interface buffer 52, and the PCI interface 54 are of a like structure and operation as the components bearing the same reference numerals and described above in connection with the interface logic 36. While the interface logic 36 provides a single frame_w signal, the interface logic 39 provides a frame_w1 signal corresponding to one DTV data stream and a frame_w2 signal corresponding to the other DTV data stream. A particular advantage of a dual DTV data stream PCI/DTV interface logic 39 is scalable picture-in-picture (PIP) functionality. This functionality has not been possible using a video port architecture providing only one data stream at a time. It should be understood that the interface logic 39 may be configured to support any number of DTV/PCI frame buffers.

Figure 5:
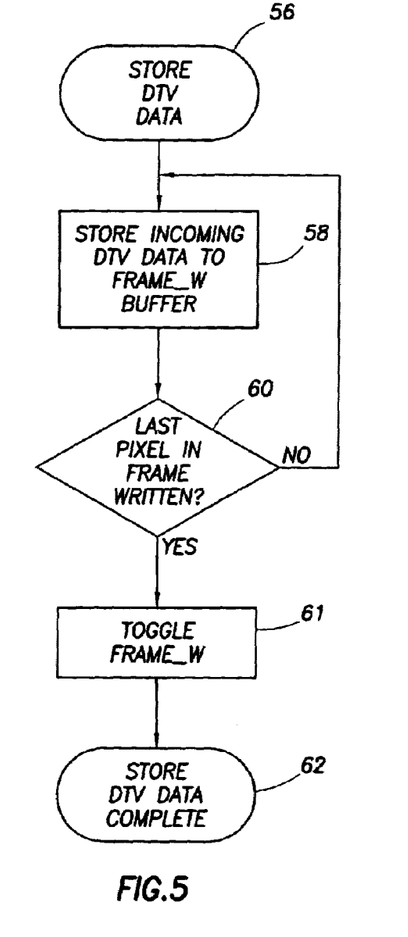
FIG. 5 is a flow chart of an exemplary store DTV data process in accordance with the write state machine of FIGS. 3–4.

Referring to FIG. 5, an exemplary store DTV data process controlled by the write state machine 43 is shown. Beginning in step 58, the incoming DTV data is stored to the DTV/PCI buffer indicated by the frame_w signal. Next, in step 60, it is determined if the last pixel in the frame has been written. If not, control returns to step 58 where the next incoming DTV data is stored. If the last pixel in the frame has been written, control proceeds to step 61 where the frame_w signal is toggled. As mentioned above, the frame_w signal indicates the DTV/PCI buffer to which the DTV interface 32 is writing. Next, control terminates through step 62 where the process is completed.

Figure 6:
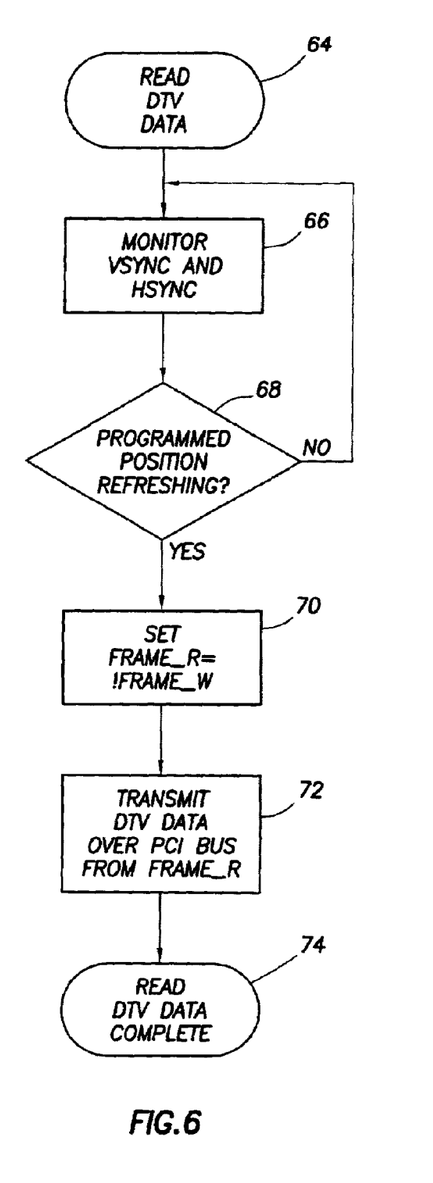
FIG. 6 is a flow chart of an exemplary read DTV data process in accordance with the read state machine of FIGS. 3–4.

Referring to FIG. 6, an exemplary read DTV data process controlled by the read state machine 41 is shown. Beginning in step 66, the horizontal sync signal HSYNC and/or the vertical sync signal VSYNC are monitored. This permits the read state machine 44 to monitor refresh of the display screen 34. Next, in step 68, it is determined if the programmed position is refreshing or has been refreshed. If the programmed position is not refreshing and has not been refreshed, then control returns to step 66. If the programmed position is refreshing or has been refreshed, then control proceeds to step 70.

In step 70, the frame_r signal is inverted from the frame_w signal. In this way, the frame_r signal is set to an opposite DTV/PCI frame buffer from the frame_w signal. Next, in step 72, outgoing DTV data is transmitted over the PCI bus 20 from the DTV/PCI frame buffer indicated by the frame_w signal to the display screen 34. The write state machine 43 and the read state machine 41 are thus helpful in tracking which DTV/PCI frame buffer contains incoming DTV data and which DTV/PCI frame buffer contains outgoing DTV data. While FIGS. 5 and 6 in combination represent a single DTV data transfer cycle, it should be understood that any number of cycles may occur. Further, it should be understood that the discussion of the frame_w signal in FIGS. 5 and 6 is equally to the applicable to the frame_w1 signal and frame_w2 signal.

Thus, in accordance with the present invention, a DTV/PCI interface logic provides at least two onboard frame buffers. The DTV interface of the interface logic writes data to one of the frame buffers. When the DTV data in that frame buffer is deep enough, the DTV interface is ready to provide incoming DTV data to a frame buffer. The memory controller then detects the frame buffer to which the DTV interface has been writing and reads DTV data out of the opposite frame buffer. In this way, DTV writes and reads do not overlap and cause tearing.

It should be understood that other DTV architectures for decoupling a refresh rate of incoming DTV data from the refresh rate of outgoing DTV data to prevent tearing are possible. Likewise, it should be understood that other DTV architectures for utilizing feedback to monitor refresh of a display device and to insure an entire frame of DTV data is provided to the display device are possible. Further, it should be understood that other DTV architectures for synchronizing transmission of outgoing DTV data to a display device with the refresh rate of incoming DTV data are possible.

While the disclosed embodiment, is described in the context of a computer system DTV architecture, it should be appreciated that the present invention may apply to any system supporting or handling DTV data. While the disclosed computer system DTV architecture includes a PCI bus, it should be understood that a DTV architecture in accordance with the present invention may alternatively support other input/output buses. Further, it should be understood that other computer system DTV architectures for pumping decoded DTV data over a local bus to a graphics controller are possible.

The foregoing disclosure and description of the preferred embodiment are illustrative and explanatory thereof, and various changes in the components, circuit elements, signals, state machines, buffering, synchronization, display techniques, anti-tearing techniques, refresh monitoring, and system environments, as well as in the details of the illustrated circuitry and construction and method of operation may be made without departing from the spirit of the invention.

We claim:

1. A method comprising:
    storing incoming frames of digital television data in a first frame buffer of an interface logic;
    reading outgoing frames of digital television data from a second frame buffer of the interface logic;
    monitoring a feedback signal provided by a graphics controller coupled to the system, the monitoring by the interface logic and the feedback signal indicates whether a programmed position of a display device has been refreshed; and
    transmitting the outgoing frames of digital television data in the second frame buffer to the graphics controller to be displayed on the display device when the programmed position of the display device is refreshed.

2. The method of claim 1, further comprising:
    storing the incoming frames of digital television data in the second frame buffer;
    reading the outgoing frames of digital television data from the first frame buffer; and
    transmitting the outgoing frames of digital television data in the first frame buffer to the display device when the programmed position of the display device is refreshed.

3. The method of claim 1, further comprising:
    detecting whether the outgoing frames of digital television data is stored in the first frame buffer or the second frame buffer.

4. The method of claim 1, the monitoring further comprising:
    monitoring a horizontal sync and a vertical sync of the display device.

5. The method of claim 1, the transmitting further comprising:
    transmitting the outgoing frames of digital television data over a peripheral component interconnect (PCI) bus.

6. A system comprising:
    a central processing unit (CPU);
    a graphics controller coupled to the CPU;
    a local bus coupled to the CPU and graphics controller; and
    digital television/local bus interface logic coupled to the graphics controller by way of the local bus, the digital television/local bus interface logic comprising:
        a digital television interface that receives incoming digital television data;
        a local bus interface that transmits outgoing digital television data to the graphics controller over the local bus;
        a first frame buffer that stores the incoming digital television data and the outgoing digital television data in an alternating manner;
        a second frame buffer that stores the outgoing digital television data and the incoming digital television data in an alternating manner; and
        a memory controller that stores the incoming digital television data to one frame buffer and reads the outgoing digital television data from another frame buffer
    wherein the graphics controller provides a feedback signal to the digital television/local bus interface logic to indicate whether a display device is refreshed.

7. The system of claim 6, wherein the local bus comprises a peripheral component interconnect (PCI) bus.

8. The system of claim 6, further comprising:
    a display device coupled to the local bus for receiving outgoing digital television data over the local bus.

9. The system of claim 6, wherein the memory controller stores the incoming digital television data to the first frame buffer and reads the outgoing digital television data from the second frame buffer on a first portion of a refresh of the display device and transmits the outgoing digital television data in the second frame buffer to the display device on a second portion of the refresh of the display device.

10. The system of claim 6, wherein the memory controller stores the incoming digital television data to the second frame buffer and reads the outgoing digital television data from the first frame buffer on a first portion of a refresh of the display device and transmits the outgoing digital television data in the first frame buffer to the display device on a second portion of the refresh of the display device.

11. The system of claim 6, wherein the local bus interface monitors a refresh of the display device for receiving the outgoing digital television data.

12. The system of claim 6, wherein a refresh rate of the incoming digital television data is decoupled from a refresh rate of the outgoing digital television data.

13. The system of claim 6, the digital television/local bus logic further comprising:

a write state machine for detecting whether the incoming digital television data is being written to the first frame buffer or the second frame buffer.

14. The system of claim 6, the digital television/local bus logic further comprising:
a read state machine for informing the memory controller of a frame buffer from which to read the outgoing digital television data.

15. A digital television/local bus interface logic, comprising:
a digital television interface that receives incoming digital television data;
a local bus interface that transmits outgoing digital television data to a graphics controller for display on a display device;
a first frame buffer that stores the incoming digital television data and the outgoing digital television data in an alternating manner;
a second frame buffer that stores the outgoing digital television data and the incoming digital television data in an alternating manner; and
a memory controller that stores the incoming digital television data to one frame buffer and reads the outgoing digital television data from another frame buffer on a first portion of a refresh of a display device and transmits tie outgoing digital television data in the one frame buffer to the display device on a second portion of the refresh of the display device, the first and second portions of the refresh identified by a feedback signal from a graphics controller.

16. The interface logic of claim 15, wherein the local bus interface comprises a peripheral component interconnect (PCI) interface.

17. The interface logic of claim 15, wherein the memory controller stores the incoming digital television data to the first frame buffer and reads the outgoing digital television data from the second frame buffer on a first portion of a refresh of the display device and transmits the outgoing digital television data in the second frame buffer to the display device on a second portion of the refresh of the display device.

18. The interface logic of claim 15, wherein the memory controller stores the incoming digital television data to the second frame buffer and reads the outgoing digital television data from the first frame buffer on a first portion of a refresh of the display device and transmits the outgoing digital television data in the first frame buffer to the display device on a second portion of the refresh of the display device.

19. The interface logic of claim 15, wherein a refresh rate of the incoming digital television data is decoupled from a refresh rate of the outgoing digital television data.

20. The interface logic of claim 15, further comprising:
a write state machine for detecting whether the incoming digital television data is being written to the first frame buffer or the second frame buffer.

21. The interface logic of claim 15, further comprising:
a read state machine for informing the memory controller of a frame buffer from which to read the outgoing digital television data.

22. A digital television data handling system, comprising:
a first means for storing incoming digital television data and outgoing digital television data in an alternating manner;
a second means for storing the incoming digital television data and the outgoing digital television data in an alternating manner;
a means for monitoring a feedback signal provided by a means for controlling graphics, the feedback signal indicates whether a programmed position of a display device has been refreshed; and
a means for transmitting the outgoing digital television data in one of the means for storing to the means for controlling graphics for display on the display device when a programmed position of the display device is refreshed.

23. The system of claim 22, the means for transmitting comprising:
a means for reading the outgoing digital television data from one of the means for storing.

24. The system of claim 22, the means for monitoring comprising:
a means for monitoring a horizontal sync and a vertical sync of the display device.

25. The system of claim 22, the means for transmitting comprising:
a means for detecting whether the outgoing digital television data is stored in the first means for storing or the second means for storing.

26. The system of claim 22, the means for transmitting comprising:
a means for transmitting the outgoing digital television data over a peripheral component interconnect (PCI) bus.

27. A closed loop digital television data anti-tearing system, comprising:
a central processing unit (CPU);
a local bus coupled to the CPU;
a graphics controller coupled to the local bus;
a display device that receives outgoing digital television data from the graphics controller; and
a digital television/local bus interface logic coupled to the local bus that stores incoming digital television data and the outgoing digital television data and selectively provides the outgoing digital television data over the local bus to the graphics controller when a programmed position of the display device is refreshed;
wherein the graphics controller provides a feedback signal to the digital television/local bus interface logic to indicate whether a display device is refreshed.

28. The anti-tearing system of claim 27, further comprising:
a core logic coupled between the local bus and the graphics controller.

29. The anti-tearing system of claim 27, further comprising:
a digital television decoder for providing incoming television data to the digital television/local bus interface logic.

30. The anti-tearing system of claim 29, further comprising:
a digital television tuner for providing incoming digital television data to the digital television decoder.

31. A closed loop digital television data anti-tearing system, comprising:
a local bus;
a graphics controller coupled to the local bus;
a display device for receiving outgoing digital television data from the graphics controller; and
a digital television/local bus interface logic coupled to the local bus for storing incoming digital television data and the outgoing digital television data and selectively providing the outgoing digital television data over the local bus to the graphics controller when a programmed position of the display device is refreshed, wherein a refresh rate of the incoming digital television data is decoupled from a refresh rate of the outgoing digital television data, and wherein the graphics controller provides a feedback signal to the digital television/local bus interface logic to indicate whether the programmed position of the display device is refreshed.

32. The anti-tearing system of claim 31, wherein the feedback signal comprises a horizontal sync and a vertical sync of the display device.

33. The anti-tearing system of claim 27, wherein the local bus comprises a peripheral component interconnect (PCI) bus.

34. A dual stream digital television/local bus interface logic, comprising:
   a first digital television interface for receiving a first incoming digital television data stream;
   a second digital television interface for receiving a second incoming digital television data stream;
   a local bus interface for transmitting a first outgoing digital data stream and a second outgoing digital television data stream;
   a first frame buffer for storing the first incoming digital television data stream and the first outgoing digital television data stream in an alternating manner;
   a second frame buffer for storing the first outgoing digital television data stream and the first incoming digital television data stream in an alternating manner;
   a third frame buffer for storing the second incoming digital television data stream and the second outgoing digital television data stream in an alternating manner;
   a fourth frame buffer for storing the second outgoing digital television data stream and the second incoming digital television data stream in an alternating manner; and
   a memory controller for storing the first incoming digital television data stream to the first frame buffer or the second frame buffer and reading the first outgoing digital television data stream from the second frame buffer of the first frame buffer on a first portion of a refresh of a display device, storing the second incoming digital television data stream to the third frame buffer or the fourth frame buffer and reading the second outgoing digital television data stream from the fourth frame buffer or the third frame buffer on the first portion of the refresh of the display device, transmitting the first outgoing digital television data stream to the display device on a second portion of the refresh of the display device, and transmitting the second outgoing digital television data stream to the display device on the second portion of the refresh of the display device.

35. The interface logic; of claim 34, wherein the local bus interface comprises a peripheral component interconnect (PCI) interface.

36. The interface logic of claim 34, wherein a refresh rate of the first outgoing digital television data stream is decoupled from a refresh rate of the first incoming digital television stream and a refresh rate of the second outgoing digital television data stream is decoupled from the refresh rate of the second incoming digital television data stream.

37. The interface logic of claim 34, further comprising:
   a local bus interface buffer for receiving and storing the first outgoing digital television data stream from the first frame buffer and the second frame buffer and for receiving and storing the second outgoing digital television data stream from the third frame buffer and the fourth frame buffer.

38. The interface logic of claim 34, further comprising:
   a first set of digital television interface buffers coupled to the first digital television interface for receiving a first incoming digital television data stream; and
   a second set of digital television interface buffers coupled to the second digital television interface for receiving the second incoming digital television data stream.

* * * * *